No. 759,526. Patented May 10, 1904.

UNITED STATES PATENT OFFICE.

WILLIAM W. HOUT, OF CORTLAND, NEW YORK.

WELDING-FLUX.

SPECIFICATION forming part of Letters Patent No. 759,526, dated May 10, 1904.

Application filed May 23, 1903. Serial No. 158,511. (No specimens.)

*To all whom it may concern:*

Be it known that I, WILLIAM W. HOUT, a citizen of the United States, residing at Cortland, in the county of Cortland and State of New York, have invented new and useful Improvements in Welding-Fluxes, of which the following is a specification.

This invention relates to a welding-flux adapted for use in joining or welding pieces of metal and separate parts of implements.

Welding-fluxes have heretofore been devised and used; but they have been generally unsatisfactory in view of the fact of objectionable sparking during the welding operation and the inability to practically retain the flux on the joint to be welded during firing or heating.

The flux forming the gist of this invention is of such nature that it will firmly cling to hot iron or steel during the heating operation preliminarily pursued previous to welding and will firmly adhere to the metal while in the fire and resist displacement by the blast of a forge or furnace, and, furthermore, it has been found that one great difficulty experienced by operators in using fluxes on metal heated in forges is obviated—namely, that sparks from the steel or iron do not fly under the hammer as when other compounds are used.

The compound or flux consists of calcined borax, iron or steel filings, drillings, or cuttings, furnace dross, (slag or cinder,) and calcined or burned marble-dust. The above-named substances may be varied in proportions in accordance with the character of the metal or metals to be welded and the prevailing contingencies or conditions present during the welding operation; but for all practical purposes it has been found generally that the proportions most effective are as follows: calcined borax, fifteen per cent.; iron or steel filings, drillings, or cuttings, thirty per cent.; furnace dross, forty per cent., and calcined marble-dust, fifteen per cent.

Calcined borax is an essential ingredient in effecting the compound, and in its practical effect is materially distinguished from ordinary borax in view of the absence of moisture therein and the necessity in the flux compound for welding purposes that there be no moisture present. The calcined marble-dust is burned until it gets red-hot and allowed to cool off before it is mixed with the other ingredients. It has been found the best marble-dust for this purpose is obtainable by breaking up old tombstones which have been exposed for a considerable length of time to the action of the elements. The calcined marble-dust holds the full ingredients intact when the flux is placed on the red-hot iron or steel and also prevents the remaining ingredients from falling under the hammer in view of the fact that such dust will not fall and absorbs what moisture there may be in the other ingredients, thus preventing sparks from flying. The dross furnace cinder or slag used in the compound and considered to be one of the principal ingredients is the melted refuse or waste of refining from Bessemer or open-hearth furnace and assists or coöperates with the other ingredients in making a superior weld.

All the above-named ingredients are reduced to a powder by a grinding process and then thoroughly mixed and fused over a hot plate and again ground to the required fineness.

In the use of the flux the pieces of iron, steel, or other metal to be welded are heated red-hot or to a color usually adopted in welding operations and plunged into the flux, the latter adhering to the metal like wax. In some instances the flux may be sprinkled or dusted over the heated metal to be welded, and in either form of application the flux on the metal when the latter is returned to the fire and subjected to a blast will remain intact with the metal.

Having thus described the invention, what is claimed as new is—

The herein-described welding flux or compound consisting of calcined borax, iron or steel filings, drillings or cuttings, furnace dross, slag or cinder, and calcined marble-dust, in or about the proportions set forth.

In testimony whereof I affix my signature in presence of two witnesses.

WILLIAM W. HOUT.

Witnesses:
O. A. KELLOGG,
D. W. VAN HOESEN.